United States Patent
Brule et al.

(10) Patent No.: US 11,746,188 B2
(45) Date of Patent: Sep. 5, 2023

(54) POLY(ARYL-ETHER-KETONE) (PAEK) POWDER SUITABLE FOR MULTIPLE USE IN SINTERING METHODS

(71) Applicant: Arkema France, Colombes (FR)

(72) Inventors: Benoît Brule, Peaumont-le-Roger (FR); Jérome Pascal, Grandchain (FR)

(73) Assignee: Arkema France, Colombes (FR)

( * ) Notice: Subject to any disclaimer, the term of this patent is extended or adjusted under 35 U.S.C. 154(b) by 256 days.

(21) Appl. No.: 16/080,261

(22) PCT Filed: Feb. 28, 2017

(86) PCT No.: PCT/FR2017/050439
§ 371 (c)(1),
(2) Date: Aug. 27, 2018

(87) PCT Pub. No.: WO2017/149233
PCT Pub. Date: Sep. 8, 2017

(65) Prior Publication Data
US 2019/0062498 A1    Feb. 28, 2019
US 2021/0171709 A2    Jun. 10, 2021

(30) Foreign Application Priority Data

Mar. 4, 2016  (FR) ........................ 1651821

(51) Int. Cl.
| | |
|---|---|
| *B29C 64/264* | (2017.01) |
| *C08G 65/40* | (2006.01) |
| *B29C 64/153* | (2017.01) |
| *B33Y 70/00* | (2020.01) |
| *B29K 71/00* | (2006.01) |
| *B33Y 10/00* | (2015.01) |
| *B29K 271/00* | (2006.01) |

(52) U.S. Cl.
CPC ........ *C08G 65/4012* (2013.01); *B29C 64/153* (2017.08); *B29C 64/264* (2017.08); *B33Y 70/00* (2014.12); *B29K 2071/00* (2013.01); *B29K 2271/00* (2013.01); *B33Y 10/00* (2014.12); *C08G 2650/40* (2013.01)

(58) Field of Classification Search
CPC ..... B33Y 70/00; B29C 64/264; B29C 64/153; B29K 2071/00; B29K 2271/00
USPC ........................................... 264/497
See application file for complete search history.

(56) References Cited

U.S. PATENT DOCUMENTS

| | | | |
|---|---|---|---|
| 9,580,551 B2 | 2/2017 | Vanelli et al. | |
| 9,587,107 B2 | 3/2017 | Bertelo et al. | |
| 2008/0258330 A1 | 10/2008 | Muller et al. | |
| 2013/0217838 A1* | 8/2013 | DeFelice ................. | B29C 67/04 525/471 |
| 2013/0323416 A1* | 12/2013 | Bertelo .................. | B33Y 70/00 427/180 |
| 2018/0134891 A1 | 5/2018 | Decraemer et al. | |
| 2018/0148572 A1 | 5/2018 | Decraemer et al. | |

FOREIGN PATENT DOCUMENTS

| | | |
|---|---|---|
| EP | 2788170 A1 | 10/2014 |
| EP | 2791209 A1 | 10/2014 |
| WO | 2012047613 A1 | 4/2012 |
| WO | 2014191674 A1 | 12/2014 |
| WO | 2014191675 A1 | 12/2014 |

OTHER PUBLICATIONS

International Preliminary Examination Report and Written Opinion for International Application No. PCT/FR2017/050439, dated May 3, 2017—7 pages.
International Search Report and Written Opinion for International Application No. PCT/FR2017/050439, dated May 3, 2017—10 pages.

* cited by examiner

*Primary Examiner* — Jeffrey M Wollschlager
*Assistant Examiner* — Xue H Liu
(74) *Attorney, Agent, or Firm* — RatnerPrestia

(57) ABSTRACT

Provided is a poly(aryl-ether-ketone) (PAEK) powder suitable for use in a method for building objects layer-by-layer by electromagnetic radiation-generated sintering, which is obtained from a thermal pretreatment at a temperature between 260° C. and 290° C. and which has a melting temperature which is stable, at the build temperature, and below or equal to 330° C.

13 Claims, No Drawings

POLY(ARYL-ETHER-KETONE) (PAEK) POWDER SUITABLE FOR MULTIPLE USE IN SINTERING METHODS

CROSS-REFERENCE TO RELATED APPLICATIONS

This is the national phase of International Application No. PCT/FR2017/050439, filed 28 Feb. 2017, which claims priority to French Application No. FR1651821, filed 4 Mar. 2016. The disclosure of each of these applications is incorporated herein by reference in its entirety for all purposes.

FIELD OF THE INVENTION

The invention relates to powders particularly intended for use in methods for additive, layer-by-layer fabrication of three-dimensional objects by electromagnetic radiation-generated sintering of said powder. In particular, it relates to poly(aryl-ether-ketone) (PAEK) powders and the recyclability thereof in such methods.

Said electromagnetic radiation can be a laser beam (in the case of laser sintering), infrared radiation, UV radiation, or any other source of radiation. The term "sintering" in the present description includes all these methods, regardless of the type of radiation. Although in the following text reference is most often made to the laser sintering method, what is written for laser sintering is of course valid for the other sintering methods.

DESCRIPTION OF THE BACKGROUND

Poly(aryl-ether-ketone)s are well-known high-performance engineering polymers. They are used for applications which are restrictive in terms of temperature and/or of mechanical or even chemical stress. These polymers can be found in fields as varied as aeronautics and aerospace; offshore drilling; automobile, train and ship building; wind power; sporting goods; construction; electronics; and medical implants. They can be used by all thermoplastic processing technologies, such as moulding, compression, extrusion, spinning, powder coating, or sintering prototyping.

In the case of powder sintering by electromagnetic radiation, a large proportion of the powder is not used during each build, also called a "run". Typically, about 85% to 90% by weight of the powder introduced into the sintering machine is unaffected by the electromagnetic radiation. It thus appears essential, for economic reasons, to be able to reuse this powder—i.e., to recycle it—in the following build(s) or "run(s)".

In general, during a laser sintering run, the PAEK powder is heated to a temperature T, called the "build temperature", about 10° C. to 20° C. (typically 15° C.) below its melting temperature Tm. However, during a sintering run, the surrounding powder—i.e., the powder not affected by the electromagnetic radiation—remains at this temperature for several hours or even several tens of hours, depending on the complexity of the part to be built, which can lead to a change in the structure of the polymer constituting the powder, thereby increasing its molecular weight, for example. This increase in molecular weight leads to an increase in viscosity which impedes coalescence between the powder particles during successive runs. This phenomenon is called "viscosity rise".

Due to this structural change, it becomes difficult or even impossible to recycle the powder because either it becomes impossible to sinter the powder or the mechanical properties of the three-dimensional part, obtained by laser sintering such a recycled powder, become diminished and inadequate owing to the presence of porosities in the sintered parts.

There is currently on the market a poly(ether-ether-ketone) (PEEK) powder marketed under the name HP3 by the company EOS, which can be used in laser sintering. However, from the first run, the PEEK powder undergoes such thermal degradation that it is not possible to reuse it for the second run. Consequently, the fabrication of three-dimensional objects by sintering of this powder is much too expensive and cannot be envisaged on an industrial scale.

Document US2013/0217838 proposes a solution for recycling PAEK powder in laser sintering. In particular, it describes the possibility of recycling PEKK powder, provided that the build temperature is substantially increased from 285° C. to 300° C. and the laser beam power is increased each time the powder is recycled in successive runs. Indeed, this document discloses that the PEKK powder used is not temperature-stable and that its melting temperature increases after its first use in a sintering method. To be able to counter this powder instability, the sintering machine parameters are modified. The laser beam power, in particular, is increased with each run. The fact of having to change these sintering parameters with each run makes industrial production slower and more difficult. Moreover, it appears difficult to mix non-recycled powder with recycled powder, because the build parameters are then complicated to adjust. Finally, the fact of having to modify the parameters with each run, and in particular to increase the laser power, leads to degradation of the polymer powder, so much so that the number of times the powder can be recycled remains too limited and it would be economically advantageous to be able to recycle it more.

SUMMARY OF THE INVENTION

The purpose of the invention is therefore to remedy at least one of the disadvantages of the prior art. In particular, the purpose of the invention is to propose a PAEK powder, in particular a powder which is suitable for multiple use in successive sintering methods, the parameters of which remain unchanged, and which makes it possible to obtain three-dimensional articles having satisfactory mechanical properties.

Another purpose of the invention is to propose a method for building a three-dimensional object layer-by-layer by electromagnetic radiation-generated sintering of powder, using such a powder.

Finally, the purpose of the invention is to propose a three-dimensional article obtained by sintering such a powder layer-by-layer using electromagnetic radiation, said three-dimensional article having satisfactory and substantially constant mechanical properties regardless of the number of times the powder is used.

The invention relates to a poly(aryl-ether-ketone) (PAEK) powder, in particular such a powder which is suitable for multiple use in a method for building objects layer-by-layer by electromagnetic radiation-generated sintering, said powder being characterized in that it is obtained from a thermal pretreatment at a temperature comprised between 260° C. and 290° C., preferably between 280° C. and 290° C., and in that it has a melting temperature which is stable, at the build temperature, and below or equal to 330° C., preferably below or equal to 320° C., and more preferably below or equal to 310° C.

Such a powder has the advantage of undergoing no (or little) viscosity rise after sintering and therefore can be used several times, and many more than twice, in successive sintering fabrication methods, without changing the parameters, while making it possible to obtain three-dimensional articles having satisfactory and substantially constant mechanical properties.

According to other optional features of the powder:
its thermal pretreatment is carried out for a period comprised between 5 min and 120 min, preferably between 5 min and 60 min, and more preferably between 5 min and 30 min;
the PAEK powder comprises a mixture of several polymers belonging to the PAEK family, the melting temperature Tm of which is below or equal to 330° C., preferably below or equal to 320° C., and more preferably below or equal to 310° C.;
the PAEK powder comprises at least one poly(ether-ketone-ketone) (PEKK) powder which represents more than 60% by weight, preferably more than 70% by weight of the powder, bounds included;
the powder is a poly(ether-ketone-ketone) (PEKK) powder;
the PEKK powder has a percentage by weight of terephthalic units relative to the sum of terephthalic and isophthalic units comprised between 55% and 65%;
the powder comprises a mixture of recycled or non-recycled powders, said recycled powders having been used an identical and/or different number of cycles.

The invention also relates to the use of the powder as described above in a method for building an object layer-by-layer by laser sintering, said powder being reusable in several successive runs.

The invention further relates to a method for building a three-dimensional object layer-by-layer by electromagnetic radiation-generated sintering of powder, characterized in that the powder used conforms to the powder described above.

Finally, the invention relates to a three-dimensional article obtained by sintering a powder layer-by-layer using electromagnetic radiation, said powder being characterized in that it conforms to the powder described above.

Other advantages and features of the invention will become more readily apparent by reading the following description provided by way of illustrative and non-limiting example.

DETAILED DESCRIPTION OF THE INVENTION

By way of preamble, it is specified that the expression "comprised between" used within the context of this description must be understood as including the cited bounds.

The term "build temperature" refers to the temperature at which the powder bed, of a constituent layer of a three-dimensional object being built, is heated during the layer-by-layer sintering method of the powder. This build temperature is below the melting temperature of the powder by 40° C., preferably by 30° C., more preferably by 20° C.

Poly(aryl-ether-ketone)s (PAEKs) consist of units having the following formulae:

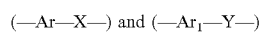

wherein:
Ar and $Ar_1$ each denote a divalent aromatic radical;
Ar and $Ar_1$ may be preferably selected from 1,3-phenylene, 1,4-phenylene, 4,4'-biphenylene, 1,4-naphthylene, 1,5-naphthylene and 2,6-naphthylene;

X designates an electron-withdrawing group; it may preferably be selected from the carbonyl group and the sulphonyl group;
Y denotes a group selected from an oxygen atom, a sulphur atom, an alkylene group, such as —$CH_2$— and isopropylidene.

In these units X and Y, at least 50%, preferably at least 70%, and more particularly at least 80% of the groups X are a carbonyl group, and at least 50%, preferably at least 70%, and more particularly at least 80% of the groups Y represent an oxygen atom. According to a preferred embodiment, 100% of the groups X denote a carbonyl group and 100% of the groups Y represent an oxygen atom.

More preferentially, the poly(arylene-ether-ketone) (PAEK) may be selected from:
a poly(ether-ketone-ketone), also called PEKK, comprising units of formula I A, formula I B and a mixture thereof:

Formula I A

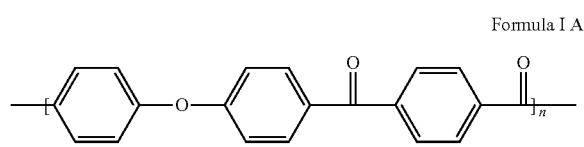

Formula I B

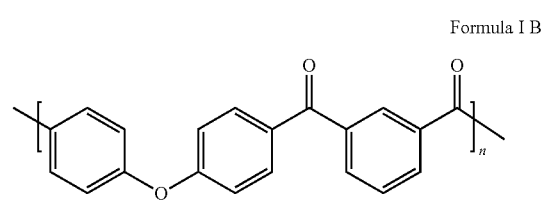

a poly(ether-ether-ketone), also called PEEK, comprising units of formula II:

Formula II

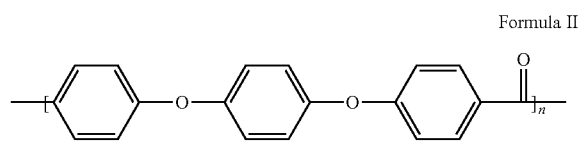

The sequences can be totally para (formula II). Similarly, meta sequences can be introduced, partially or totally, into these structures at the ethers and the ketones according to the two examples of formulae III and IV below:

Formula III

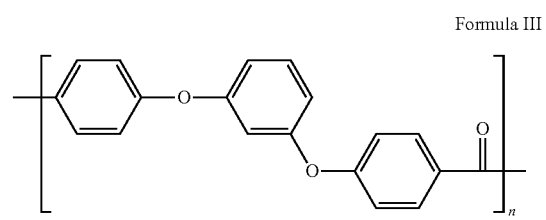

Or:

Formula IV $$\left[\begin{array}{c}\phantom{O}\\\phantom{O}\end{array}\right]_n$$

Or ortho sequences according to formula V:

Formula V a poly(ether-ketone), also called PEK, comprising units of formula VI:

Formula VI

Similarly, the sequence may be totally para, but meta sequences can also be partially or totally introduced (formulae VII and VIII):

Formula VII

Or

Formula VIII a poly(ether-ether-ketone-ketone), also called PEEKK, comprising units of formula IX:

Formula IX

Similarly, meta sequences can be introduced into these structures at the ethers and the ketones.

a poly(ether-ether-ether-ketone), also called PEEEK, comprising units of formula X:

Formula X

Similarly, meta sequences can be introduced into these structures at the ethers and the ketones, but also biphenol sequences according to formula XI:

Formula XI

Other arrangements of the carbonyl group and the oxygen atom are also possible.

Among the PAEKs described above, some have a melting temperature Tm above 330° C. However, it is well known to persons skilled in the art that the melting temperature can be lowered by introducing co-monomers into the formulae. One example is a PEEK-based copolymer with addition of biphenol-type co-monomers (formula XI).

Preferably, the PAEKs used in the invention are selected from PEKKs, PEEK-based copolymers, and PEK-based copolymers.

Advantageously, the PAEK powder of the invention suitable for use in a method for additive building of objects, layer-by-layer, by electromagnetic radiation-generated sintering of powder is obtained from a thermal pretreatment carried out at a temperature comprised between 260° C. and 290° C., preferably between 280° C. and 290° C.

The PAEK polymer is indeed not used as it is, directly after synthesis, in a layer-by-layer sintering fabrication method. It is first transformed into a powder, by milling, to modify the particle size distribution of the polymer so as to obtain a powder having a suitable particle size distribution, known to persons skilled in the art, compatible with the laser sintering fabrication method. This milling step can be preceded or followed by other treatments, such as for example one or more additions of additive(s), filler(s) or fibres in the powder.

Advantageously, the thermal treatment prior to the sintering step, carried out after the milling step, makes it possible to modify the thermal signature of the polymer, without modifying its particle size distribution. In the PEKK, the polymer material constituting the initial powder, obtained directly after synthesis, has two melting peaks, called the high-temperature and low-temperature melting peaks. Thermal pretreatment makes it possible to eliminate the low-temperature melting peak and to stabilise the crystalline morphology of the polymer, without modifying its high melting temperature.

Thanks to this thermal pretreatment, the powder of the invention has a stable melting temperature, at the build temperature. Within the meaning of the invention, a stable melting temperature Tm means that the melting temperature does not increase by more than 3° C. after each laser sintering run, and preferably it does not increase by more than 2° C., and more preferably it does not increase by more than 1° C. Preferably, the melting temperature of the polymer powder is below or equal to 330° C., more preferably below or equal to 320° C., and even more preferably below or equal to 310° C.

Such a powder has the advantage of being thermally stable during a sintering fabrication method and does not change. Its molecular weight notably remains stable and the phenomenon of viscosity rise due to increased molecular weight, which has been observed heretofore, appears little if at all.

Preferably, the thermal pretreatment of the powder is carried out for a period comprised between 5 min and 120 min, preferably between 5 min and 60 min, and more preferably between 5 min and 30 min.

The layer-by-layer fabrication method by sintering the powder by means of electromagnetic radiation is then carried out at a build temperature of the same order of magnitude as that of the thermal pretreatment. This build temperature is below the melting temperature of the powder by 40° C., preferably by 30° C. and more preferably by 20° C. Preferably, the build temperature is below 290° C.

The PAEK powder can comprise a mixture of several polymers belonging to the PAEK family, the melting temperature Tm of which is below 330° C., preferably below or equal to 320° C., and more preferably below or equal to 310° C.

Preferably, the PAEK powder comprises at least one poly(ether-ketone-ketone) (PEKK) powder which represents more than 60%, preferably more than 70% by weight of the powder, bounds included. The remaining 30% to 40% by weight may for example be constituted either by other polymers belonging to the PAEK family, the melting temperature of which is below or equal to 330° C., and/or by fillers and/or by fibres, such as carbon fibres, glass fibres for example, by glass beads, by mineral fillers, or by carbon blacks, graphites, graphenes, carbon nanotubes.

More preferably, the PAEK powder is a PEKK powder. Advantageously, this PEKK powder has a percentage by weight of terephthalic units relative to the sum of terephthalic and isophthalic units comprised between 55% and 65%, and preferably this ratio is 60%.

Due to this thermal stability of the powder, it can be used a large number of times in successive layer-by-layer object fabrication methods, by sintering powder by means of laser radiation, for example.

Moreover, due to this stability of the powder, the parameters of the sintering fabrication machine, such as laser power and/or powder bed temperature, remain unchanged regardless of the number of times the powder is subsequently used. As a result, the fabrication of objects by laser sintering is more productive. Since the recyclability of the powder is improved, the sintering of PAEK powder becomes economically attractive and industrially possible.

Finally, because the sintering parameters remain unchanged, it becomes possible and easy to use a powder comprising a mixture of different recycled or non-recycled powders, said recycled powders possibly having been used an identical and/or different number of cycles.

The powder of the invention is thus very attractive economically since it can be recycled several times in a sintering method, while guaranteeing the same fabrication machine settings.

Finally, the invention relates to a three-dimensional article obtained by sintering the powder which has just been described, layer-by-layer, using electromagnetic radiation, such as laser radiation for example. The object obtained has satisfactory and constant mechanical properties regardless of the number of times the powder has been used.

EXAMPLES

1. Changes in PAEK Powders after Initial Sintering

Two PEKK powders are compared: a reference PEKK powder, comprising 60% terephthalic units and 40% isophthalic units and not having undergone thermal pretreatment, and a PEKK powder of the invention, comprising 60% terephthalic units and 40% isophthalic units.

After synthesis of the two PEKK polymers, they are milled into powder. Only the powder of the invention undergoes a thermal pretreatment of 120 minutes at 285° C.

The solution viscosity in 96% sulphuric acid of the reference powder is then measured at 0.87 dL/g. The solution viscosity in 96% sulphuric acid of the powder of the invention is measured at 0.85 dL/g. The viscosities are measured at 25° C. using an Ubbelohde tube-type viscometer.

The two powders are then each placed in a tube under nitrogen sweeping and heated to 285° C. for 24 hours. Each powder is then re-analysed in terms of solution viscosity, and a viscosity of 0.90 dL/g is found for the reference powder and a viscosity of 0.85 dL/g for the powder of the invention. Consequently, the viscosity of the reference powder increases by more than 3% after 24 hours at 285° C., whereas the viscosity of the powder of the invention remains constant. The measurement uncertainty corresponds to 0.01 dL/g.

TABLE I

|  | Inherent viscosity at t0 (in dL/g) | Inherent viscosity after 24 h at 285° C. (in dL/g) | Change in inherent viscosity |
|---|---|---|---|
| Reference PEKK | 0.87 | 0.90 | +3.4% |
| PEKK of the invention | 0.85 | 0.85 | approx. 0% or <1% |

The PEKK powder of the invention has an inherent viscosity which does not change significantly (change between 0% and 1%, corresponding to the measurement uncertainty), unlike the reference powder whose inherent viscosity increases significantly by more than 3%.

2. Recyclability after Sintering at a Build Temperature Equal to Tm−15° C.

The two powders of Example 1 and a PEEK powder marketed by the company EOS under the name HP3 were compared after an initial sintering at a temperature 15° C. below their respective melting temperatures, and their recyclability at the conclusion of this sintering was evaluated.

PEEK powder HP3 has a melting temperature of 372° C. The reference PEKK powder has, before the initial sintering, a melting temperature $Tm_1$ of 300° C., but this temperature changes and increases after the initial sintering, by about 15 degrees. The PEKK powder of the invention, in turn, has an average melting temperature of 300° C., which remains constant after the sintering method. This is referred to here as the "average melting temperature" because, even if it does not change, it may be slightly different depending on the batches of powder and varies between 297° C. and 303° C.

The melting temperature is measured by differential scanning calorimetry (DSC) according to standard ISO11357-3.

The skilled person knows that, for a PAEK powder, it is usual to heat the fabrication chamber to a build temperature 10° C. to 20° C. (typically 15° C.) below the melting temperature of the polymer material constituting the powder in order to be able to produce a three-dimensional object by laser sintering with good performance in terms of sintering and of mechanical properties of the final object obtained.

Laser sintering tests were carried out on a DTM Sinterstation 2500 modified to work at high temperatures (i.e., up to 300° C.). The powder not subjected to the laser beam, and thus not sintered, remaining in the fabrication compartment, also called "powder to be recycled", was recovered.

The initial powder—i.e., before its initial use in the laser sintering machine—and the powder to be recycled were compared in solution. To this end, about 30 mg of powder is dissolved in 1 mL of 4-chlorophenol at 150° C. for 24 h. After cooling the solution to room temperature, 14 mL of hexafluoroisopropanol (HFIP) is added. The solution is filtered on an Acrodisc syringe filter with a polytetrafluoroethylene (PTFE) membrane with a 25-mm diameter and a 0.2-μm pore size.

TABLE II

|  | HP3 | Reference PEKK | PEKK of the invention |
|---|---|---|---|
| Tm of the initial powder | 372° C. | $Tm_1$ (300° C.) | 300° C. |
| Solubility of the initial powder | Soluble | Soluble | Soluble |
| Tm of the powder to be recycled | 386° C. | $Tm_2 > Tm_1$ by about 15° C. | 300° C. |
| Solubility of the powder to be recycled | Insoluble (>99% insolubles) | Soluble (<5% insolubles) | Soluble (<5% insolubles) |

The results, summarised in Table II above, show that when the build temperature is set 15° C. below the melting temperature, PEEK powder HP3, once used, becomes insoluble with more than 99% by weight insoluble particles, which means that it has cross-linked, its molecular weight has increased, and the polymer has changed structure.

The other two PEKK powders are soluble, with less than 5% by weight insoluble particles, which means that they can be reused.

However, the reference PEKK powder, after the initial sintering, has a second melting temperature $Tm_2$ higher than the first by about 15 degrees. The effect of this increase in the melting temperature, in terms of being able to recycle the powder again in a laser sintering method, is to modify the sintering parameters, and in particular the build temperature, but also the laser beam power.

The PEKK powder of the invention has a constant melting temperature during the laser sintering method. It thus makes it possible to obtain one or more other sintered parts without changing the parameters of the sintering apparatus.

3. Sinterability at Constant Build Temperature

The three powders-HP3, reference PEKK, and PEKK of the invention—are again compared for their sinterability at a fixed, constant build temperature, regardless of the number of sintering cycles.

To be able to recycle the powder, the experiment was conducted by setting the build temperature at 285° C., in order to avoid thermal degradation of the powder and to be able to recycle it in subsequent laser sintering runs. Sintering is carried out under the same experimental conditions, in particular at a fixed build temperature and for a suitable and constant laser power.

The initial powder—i.e., before the initial sintering—was compared with the powder recovered from the fabrication compartment after sintering (i.e., the powder to be recycled) and with a powder recycled once. For each of these powders, the mechanical properties of the sintered specimens were measured and compared, in particular tensile modulus and elongation at break.

The results of these comparisons are summarised in Table III below.

TABLE III

|  | HP3 | Reference PEKK | PEKK of the invention |
|---|---|---|---|
| Mechanical properties of the object obtained after the $1^{st}$ sintering | inadequate | good | good |
| Powder can be recycled a first time | YES | YES | YES |
| Mechanical properties of the object obtained after the $2^{nd}$ sintering | inadequate | inadequate | good |
| Powder can be recycled a second time | YES | YES | YES |

It turns out that at the build temperature of 285° C., which is much below the melting temperature of 372° C. of PEEK powder HP3, said powder HP3 is not degraded and can be recycled. On the other hand, at this temperature, the powder is not sintered properly and the three-dimensional object obtained does not have good mechanical properties; it does not pass the tests.

The reference PEKK is also recyclable and the object obtained after the first sintering has good mechanical properties. On the other hand, if the same build temperature is left at 285° C. for a second test then, in this case, the powder is again recyclable but the three-dimensional object obtained has mechanical properties whose performance is significantly reduced.

In this case, only the PEKK powder of the invention makes it possible to obtain sintered specimens with good mechanical properties, regardless of the number of sintering cycles and without changing the sintering parameters of both build temperature and laser beam power.

4. Successive Sintering Tests of Various Powders Under Conventional Sintering Conditions Table IV below summarises the parameters of the laser sintering machine, within the context of successive runs, carried out under conventional conditions, with the three powders—HP3, reference PEKK, and PEKK of the invention—making it possible to obtain sintered parts having satisfactory mechanical properties. The number of builds (tests) indicated in the table is 4, but, for the powder of the invention, sintered parts could be obtained with recycled powder a greater number of times without observing a significant decrease in mechanical properties.

TABLE IV

|  | Laser power (W) | | | Build temperature (° C.) | | |
|---|---|---|---|---|---|---|
|  | HP3 | Reference PEKK | PEKK of the invention | HP3 | Reference PEKK | PEKK of the invention |
| Test 1 | 30 | 30 | 30 | 357 | 285 | 285 |
| Test 2 | — | 39 | 30 | — | 300 | 285 |
| Test 3 | — | 42 | 30 | — | 300 | 285 |
| Test 4 | — | — | 30 | — | — | 285 |

This table shows that the PEKK powder of the invention, used several times consecutively to produce three-dimensional objects layer-by-layer, by laser sintering of the powder, makes it possible to obtain objects having satisfactory and stable mechanical properties regardless of the number of times the powder is recycled. Moreover, the build parameters of the laser sintering machine remain unchanged regardless of the number of times the powder is recycled.

It was observed, with the reference PEKK powder of the prior art, that the mechanical properties of the three-dimensional object obtained after 2 cycles are affected and begin to decrease. It thus becomes very difficult to recycle this powder in sintering methods beyond 3 or 4 cycles.

The PAEK powder of the invention which has just been described, with a stable melting temperature below 330° C. and preferably below or equal to 310° C., has improved recyclability, so that it becomes very economically attractive. It makes it possible to build three-dimensional objects by sintering, without changing the parameters of the sintering method, thus significantly improving productivity. Finally, the three-dimensional objects obtained have satisfactory and constant mechanical properties regardless of the number of cycles.

The invention claimed is:

1. A method for building a three-dimensional object layer-by-layer by electromagnetic radiation-generated sintering of powder,
   wherein the powder is a poly(aryl-ether-ketone) (PAEK) powder, the powder being obtained from thermal pretreatment at a temperature between 260° C. and 290° C. and having a melting temperature which is stable at the build temperature and which is below or equal to 330° C.,
   wherein the powder comprises a mixture of recycled and non-recycled powders,
   wherein parameters of the sintering machine include laser power and powder bed temperature,
   wherein the sintering is conducted in a sintering machine and wherein at least two successive sinterings are carried out while keeping the laser power of the sintering machine and the bed temperature unchanged, and
   wherein the second sintering of the at least two successive sinterings uses the unsintered powder from the first sintering of the at least two successive sinterings as recycled powder.

2. The method according to claim 1, wherein the thermal pretreatment is carried out for a period between 5 min and 120 min.

3. The method according to claim 1, wherein the powder comprises a mixture of several polymers belonging to the PAEK family, the melting temperature Tm of which is below or equal to 330° C.

4. The method according to claim 1, wherein the powder comprises at least one poly(ether-ketone-ketone) (PEKK) powder which represents more than 60% by weight, bounds included.

5. The method according to claim 1, wherein the powder is a poly(ether-ketone-ketone) (PEKK) powder.

6. The method according to claim 4, wherein the PEKK powder has a percentage by weight of terephthalic units relative to the sum of terephthalic and isophthalic units comprised between 55% and 65%.

7. The method according to claim 1, wherein molecular weight of the powder remains stable during sintering.

8. The method according to claim 1, wherein melting temperature of the powder does not increase by more than 2° C. after each sintering run.

9. The method according to claim 1, wherein melting temperature of the powder does not increase by more than 1° C. after each sintering run.

10. A method for building a three-dimensional object layer-by-layer by electromagnetic radiation-generated sintering of powder,
    wherein the powder is a poly(aryl-ether-ketone) (PAEK) powder, the powder being obtained from thermal pretreatment at a temperature between 260° C. and 290° C. and having a melting temperature which is stable at the build temperature and which is below or equal to 330° C.,
    wherein the powder comprises a mixture of recycled and non-recycled powders, the recycled powders having been used in an identical and/or a different number of cycles,
    wherein parameters of the sintering machine include laser power and powder bed temperature,
    wherein the sintering is conducted in a sintering machine and wherein successive sintering is carried out while keeping the bed temperature unchanged,
    wherein the bed temperature is the same bed temperature as the one which would be used for sintering a totally non-recycled powder of the PAEK.

11. The method according to claim 10, wherein the bed temperature is the same bed temperature as the one which would be used for sintering a totally non-recycled powder of the PAEK, and the laser power is the same laser power as the one which would be used for sintering a totally non-recycled powder of the PAEK.

12. A method for building a three-dimensional object layer-by-layer by electromagnetic radiation-generated sintering of powder,
    wherein the powder is a poly(aryl-ether-ketone) (PAEK) powder, the powder being obtained from thermal pretreatment at a temperature between 260° C. and 290° C. and having a melting temperature which is stable at the build temperature and which is below or equal to 330° C.,
    wherein the powder comprises a mixture of recycled and non-recycled powders, the recycled powders having been used in an identical and/or a different number of cycles,
    wherein parameters of the sintering machine include laser power and powder bed temperature,
    wherein the sintering is conducted in a sintering machine and wherein successive sintering is carried out while keeping laser power of the sintering machine, the bed temperature unchanged, wherein the laser power is the same laser power as the one which would be used for sintering a totally non-recycled powder of said PAEK.

13. The method according to claim 12, wherein the bed temperature is the same bed temperature as the one which would be used for sintering a totally non-recycled powder of the PAEK, and the laser power is the same laser power as the one which would be used for sintering a totally non-recycled powder of the PAEK.

* * * * *